Jan. 12, 1965

J. J. BRAND 3,165,018

GLASS CUTTER HAVING MEANS TO RETAIN CUTTER
IN AN INOPERATIVE POSITION

Filed Feb. 5, 1962

INVENTOR.
JAY J. BRAND

BY Oscar H. Spencer
ATTORNEY

INVENTOR.
JAY J. BRAND
BY
Oscar H. Spencer
ATTORNEY

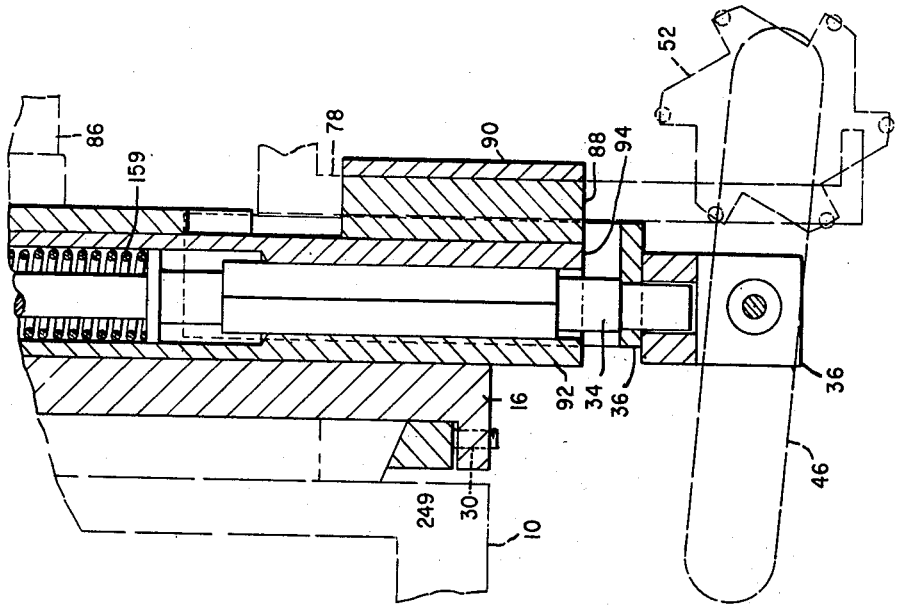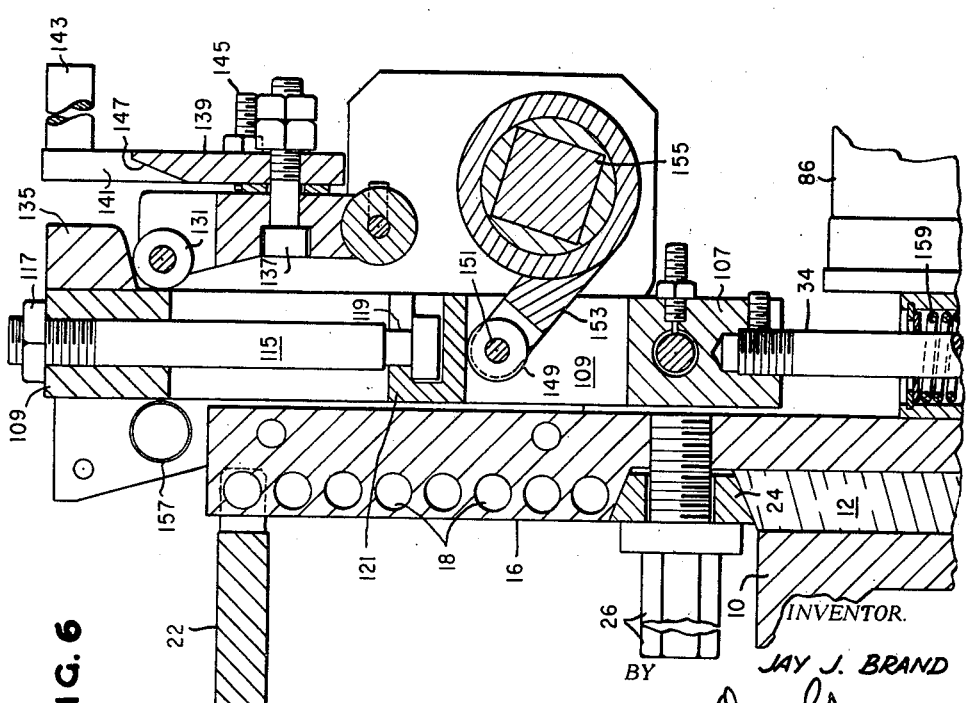

United States Patent Office 3,165,018
Patented Jan. 12, 1965

3,165,018
GLASS CUTTER HAVING MEANS TO RETAIN CUTTER IN AN INOPERATIVE POSITION
Jay J. Brand, Pittsburgh, Pa., assignor to Pittsburgh Plate Glass Company, Pittsburgh, Pa., a corporation of Pennsylvania
Filed Feb. 5, 1962, Ser. No. 171,116
5 Claims. (Cl. 83—11)

This invention relates to a glass cutting apparatus and more specifically to an assembly for cutting or scoring a glass sheet.

A cutting assembly is provided which is particularly well suited for operation in a movable bridge of cutters of the type disclosed and claimed in my co-pending application Serial No. 11,261 filed February 26, 1960 and assigned to the assignee of the present invention, of which this case is a divisional application, and wherein a plurality of cutter assemblies of the present invention are mounted on a bridge member which is transverse to the glass sheet to be cut.

In accordance with my invention, a cutter assembly is provided having a cutter wheel mounted on a plunger adapted for vertical movement between raised and lowered positions. An arm is provided for raising said plunger and means are provided to retain said plunger in its raised position. Means are also provided to prevent said retaining means from actually entering into its retaining position.

This invention will be better understood from the description which follows of a preferred embodiment of the apparatus taken along with the drawings in which similar parts are generally designated for the same numeral and in which:

FIGURE 6 is a vertical section taken along the lines 6—6 of FIGURE 4;

FIGURE 7 is a vertical cross section taken along the line 7—7 of FIGURE 5.

Figure 1:
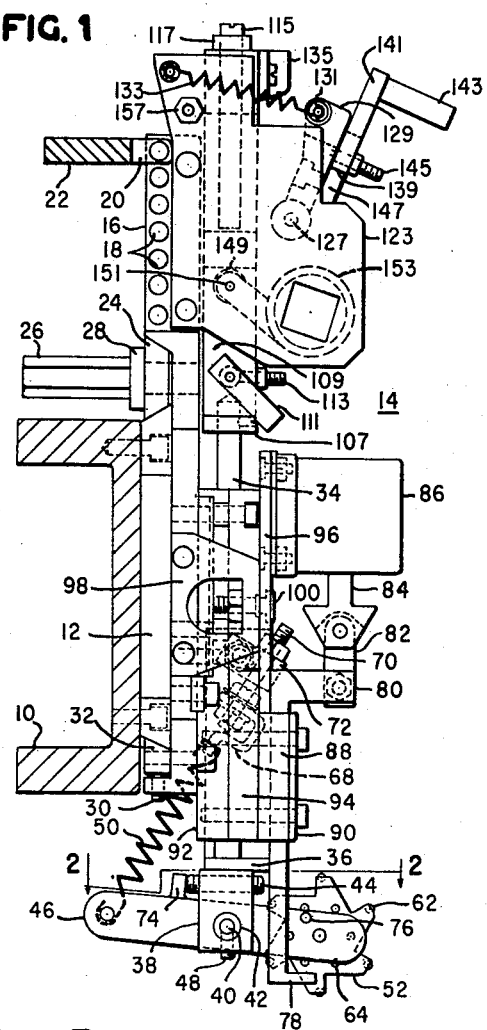
FIGURE 1 is an elevation view of a cutter assembly of the present invention.
Figure 2:
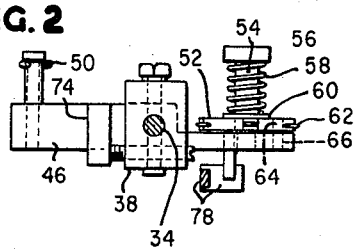
FIGURE 2 is a cross section taken along line 2—2 of FIGURE 1.
Figure 3:
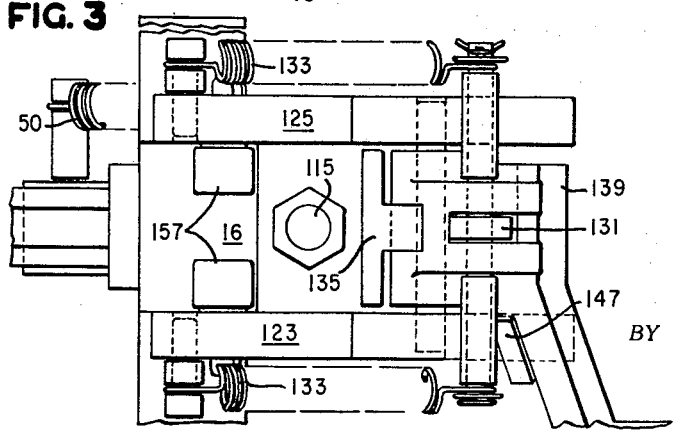
FIGURE 3 is a plan view of the cutter assembly of the present invention shown in FIGURE 1.

With reference to the drawings, and particularly FIGURE 1, mounted on the web of a channel iron 10 of a cutting bridge (not shown), which is transverse to the glass sheet to be cut, is a plate 12 that extends substantially the entire length of channel iron 10. A cutter assembly 14 of the present invention has a back plate 16. The plate 16 has at its upper portion a number of apertures 18 that are in a vertical row. By connecting the ear 20 of bar 22 to one of the apertures 18 of back plate 16, the cutter assembly 14 can be aligned horizontally at a different position along plate 12 by adjustment of bar 22.

The lower portion of back plate 16 has a recessed portion which abuts plate 12. The top edge of plate 12 and the opposing top horizontal edge of the recessed portion of back plate 16 are inclined with respect to each other to receive a wedge 24 between their surfaces. The wedge 24 has an aperture through which extends a bolt 26 which is threaded into plate 16. The bolt 26 has a shoulder 28 which moves wedge 24 towards the inclined surfaces, so that, when bolt 26 is tightened, wedge 24 is held tight against plate 12 and back plate 16.

The recess in plate 16 results in a bottom flange having vertical threaded apertures in which are placed screws 30.

A stop or gib 32 is placed between screws 30 and the bottom edge of plate 12 which is inclined as is the top surface of gib 32. The gib 32 is bolted to back plate 16. Thus, gib 32, which prevents any tilting action of cutter assembly 14, insures vertical alignment of the latter.

The cutter assembly 14 has a plunger 34. The bottom end of plunger 34 is welded to a spring clamp support 36. A cutter arm yoke 38 is welded to clamp support 36. Through the bifurcated arms of yoke 38 extends a pin 40 which is journaled in bearing 42 in yoke 36. A stop screw 44 is threaded horizontally in the top portion of yoke 38.

A cutter holder arm 46 is fixed on pin 40 by a set screw 48. The arm 46 extends between the bifurcated arms of yoke 38. A spring 50 is connected to one end of arm 46. A turret cutter holder 52 is mounted on the other end of arm 46 by a pin 54 which is threaded in arm 46. Between the nob 56 of pin 54 and turret holder 52 is a spring 58 that abuts the nob 56 and a washer 60.

The turret holder 52 has a number of peripheral grooves in which are mounted glass cutter wheels 62 in a conventional manner with spring clips (not shown). The turret holder 52 has a number of apertures 64 which are arranged in a circle about the axis of pin 54. A pin 66 is mounted on cutter arm 46 in a position so that it extends into one of the apertures 64. Thus, an operator can easily move turret holder 52 away from arm 46 to permit rotation of cutter heads 62 and then when turret holder 52 is released spring 58 will force it against arm 46. Of course, this is done when another one of apertures 64 is in alignment with pin 66. This positions a different cutter wheel 62 to score the glass sheet when cutter assembly 14 is lowered onto the glass to be cut.

The spring 50 is connected at its other end to a clamp 68 connected by bolt 70 to a spring adjuster block 72 bolted to the top end of spring clamp support 36 at its top end. Thus, spring adjuster block 72 moves up and down with plunger 34. The spring 50 biases turret 52 downwardly. This downward force is limited by tab 74 on arm 46 abutting limit screw 44 mounted in yoke 38.

In addition to pin 66, one end of arm 46 has a pin 76 extending from the opposite vertical face of arm 46. A lifting bar 78 has at its top end a bifurcated horizontal flange 80 which is joined by a connecting bar 82 to a shaft 84 of a solenoid 86.

The lifting bar 78 has its main vertical portion sliding between a guide 88 and a guide cover plate 90 which are bolted to a housing member 82 through a housing member 94. The housing members 92 and 94 enclose the central portion of plunger 34 and provide a vertical aperture which corresponds in cross section to the central portion of plunger 34 which has four vertical ribs equally spaced from one another. The housing member 94 is also bolted to housing member 92 which is bolted to plate 16.

Figure 5:
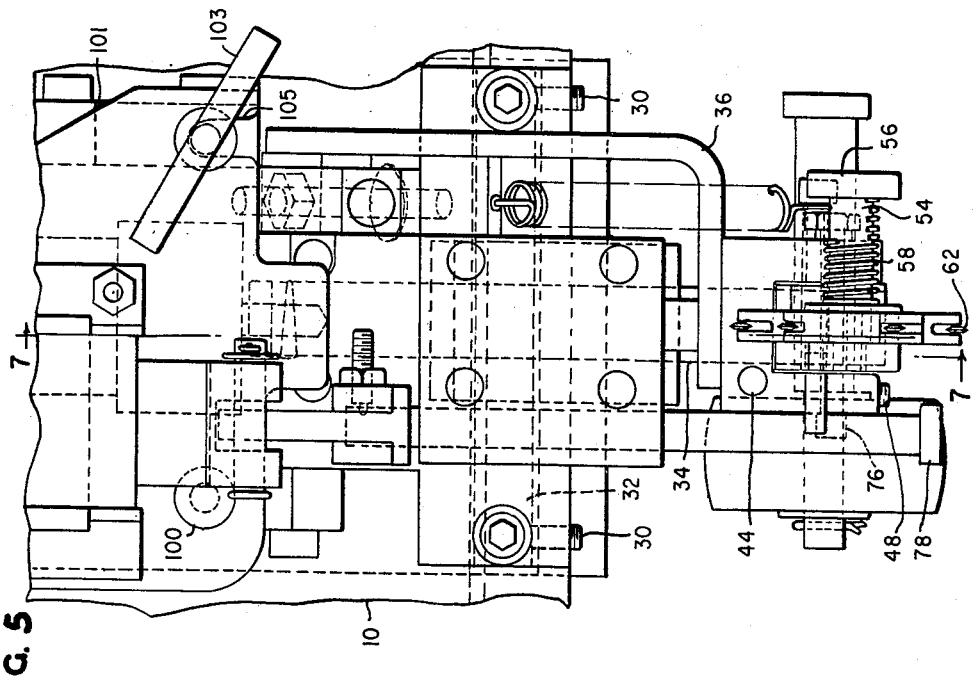
FIGURE 5 is a front elevation of a lower portion of a cutter assembly of the present invention.

The solenoid 86 is mounted on plate 96. A clamp block 98 (FIGURE 1) pivotally supports plate 96 by bolt 100. The clamp block 98 is mounted on one vertical side of plate 16. A clamp block 101 (FIGURE 5) is bolted on the other vertical edge of plate 16. A wing bolt 103 extends through a notch 105 in plate 96 and into block 101. The wing bolt 103 holds plate 96 against clamp block 101. By loosening wing bolt 103 plate 96 can be pivoted about bolt 100 to swing solenoid 86 out of the way after its shaft 84 is disconnected from bar 82. The solenoid 86 can be disconnected from plate 96 and replaced by another solenoid. Then plate 96 is pivoted to the position where its shaft 84 is connected to bar 82. The wing bolt 103 is then tightened.

The top end of plunger 34 is threaded into a yoke block 107 which has a horizontal aperture in alignment with the apertures in the bottom bifurcated ends of plunger yoke 109 for receiving a connecting bar 111. The shaft of bar 111 has a peripheral groove which is engaged by the end of a spring plunger 113 mounted in yoke block 107. By this construction, plunger 34 is connected to plunger yoke 109 but is readily disconnected from yoke 109 by pulling on plunger 113.

The top of plunger yoke 109 has a vertical aperture in which is threaded an adjusting screw 115 which can be fixed by a nut 117. The shank of adjusting screw 115 has a peripheral groove 119 adjacent its head so that screw 115 supports the adjusting screw block 121. With this construction the block 121 is adjustably fixed in position between bifurcated arms of plunger yoke 109.

Plates 123 and 125 are bolted on the vertical sides of plate 16 with plunger yoke 109 between them. The plates 123 and 125 have aligned apertures to receive a pin 127 between them. The pin 127 pivotally supports a retaining arm 129 which is bifurcated at its top end to support a roller 131. Each of the bifurcated ends of arm 129 has connected to it a spring 133. The other ends of spring 133 are connected to plates 123 and 125. Thus, roller 131 is spring biased towards a roller block 135 mounted on the top portion of plunger yoke 109. The retaining arm 129 pivotally supports a screw 137 (FIGURE 6) which is threaded into a switch 139 which has an arm 141 on which is mounted a handle 143. A spring plunger 145 is mounted on switch 139. The retaining arm 129 has two recesses which are disposed in an arc about the pivot axis of screw 137. The spring plunger 145 retains switch 139 in one of two positions depending upon the recess of retaining arm 129 in which spring plunger 145 is positioned. The plunger 145 is moved out of this position and switch 139 pivoted to the other position by movement of arm 141.

Figure 4:
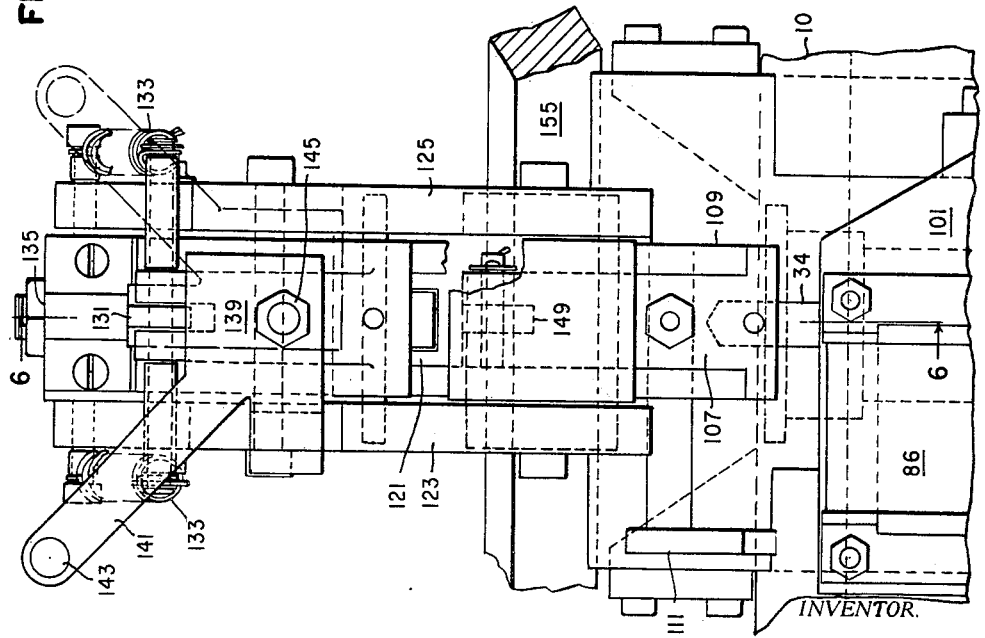
FIGURE 4 is a front elevation of the upper portion of a cutter assembly of the present invention.

The switch 139 has an inclined surface 306 so that as switch 139 is pivoted the inclined cam surface 147 moves along an edge of plate 123. As a result, in one pivotal position of switch 139 retaining arm 129 is in the position shown in FIGURE 1 and in full lines in FIGURE 4, whereas in the other pivotal position of switch 139 (shown in phantom in FIGURE 4 and in full lines in FIGURE 6) spring 133 moves retaining arm 129 to position roller 131 below roller block 135. In the latter position roller 131 prevents lowering of block 135 and thus prevents lowering of plunger yoke 109.

A roller 149 below block 121 is rotatably mounted on a pin 151 mounted on a bifurcated end of lifting arm 153. The arm 153 is mounted on square shaft 155 for pivot with rotation of shaft 155. The plates 123 and 125 support roller bearings 157 which abut plunger yoke 109. The plunger 34 is biased downwardly by a spring 159 enclosed within guide housing 92 and 94.

Shaft 155 is rotated counter-clockwise (as viewed in FIGURES 1 and 6) as the cutter assembly is moved into cutting position over the glass sheet to be scored by movement of the bridge assembly, as described in the parent application Serial No. 11,261. Rotation of square shaft 155 counter-clockwise lowers roller 149 so that block 121, plunger yoke 109 and plunger 34 are lowered, thereby lowering cutter wheel 62 onto the glass sheet and into scoring position. This occurs so long as roller 131 is not directly below block 135. However, when roller 131 is directly below block 135 with switch 139 in the position shown in FIGURE 6, the lowering of cutter wheel 62 is prevented. An operator may determine which of above described cutter assemblies 14 in a cutter bridge arrangement are to be used for a scoring operation on a glass sheet by a proper positioning of switch 139. When an operator wishes to cancel, for an individual scoring operation, a cutter assembly 14, solenoid 86 of the cutter assembly 14 to be cancelled from operation is energized by closing an electrical circuit (not shown). The energization of this solenoid 86 lifts shaft 84 thereby lifting arm 78, so that, when square shaft 155 is rotated to lower plunger 34, pin 76 is lowered into abutment with raised arm 78. The arm 78 prevents further lowering of turret cutter 52 and the end of arm 46 on which turret cutter 52 is mounted. Then arm 46 pivots about pin 40. This prevents cutter wheel 62 from engaging the glass sheet. This is a temporary means for keeping a particular cutter assembly from engaging in a scoring operation. When it is desired to prevent a particular cutter assembly 14 from being used in a series of scoring operations, it is preferable to pivot switch 139 to the position shown in FIGURE 6 rather than rely upon continued energization of solenoid 86 of that cutter assembly 14.

Various modifications of the apparatus will be apparent to one skilled in the art from the description of the preferred embodiment presented above and in the drawings. Thus, the invention is not to be limited by this description but only the claims that follow.

I claim:

1. A cutter assembly comprising a support structure; a vertically oriented plunger mounted for movement on said support structure between a raised and lowered position; a cutter wheel mounted adjacent the lower portion of said plunger; means, including a lifting arm operatively associated with said plunger and movable between an upper and lower position, for lifting said plunger to its raised position; means mounting said lifting arm for movement between said upper and lower position; means, including a selectively actuated retaining arm on said support structure, for retaining said vertically oriented plunger in its raised position independently of said lifting arm; switch means operatively associated with said retaining arm and movable to a position for preventing said retaining arm from restraining said plunger in its raised position; and means associated with said switch means for retaining said switch means in said position.

2. A cutter assembly which comprises a cutter wheel, a support plate, a guide housing, a plunger having a hole in its upper portion, said guide housing and plunger being constructed and arranged to provide vertical movement only of said plunger between lowered and raised positions, said cutter wheel being mounted on the bottom part of said plunger, a lifting arm extending into said hole for raising said plunger by pivotal movement of said lifting arm, means mounting said lifting arm for pivotal movement, a block mounted on the top part of said plunger and having a downwardly facing cam surface, a retaining arm, means for pivotally mounting said retaining arm on the support plate for movement between a first position in which an end of said retaining arm is in a vertical plane other than one through said block and a second position in which said end is below said block, means urging said retaining arm toward the second position and means to restrain said retaining arm in the first position.

3. The cutter assembly of claim 2 wherein said cutter wheel is rotatably mounted on said plunger by a cutter arm mounted on the bottom part of said plunger for pivotal movement about a horizontal axis and said cutter wheel is rotatably mounted on said cutter arm and wherein said cutter assembly includes a second lifting arm, a housing mounted on the support plate to guide said second lifting arm, means to raise said second lifting arm from a first position spaced below said cutter arm and a second position lifting said cutter arm when said plunger is at said lowered position.

4. A cutter assembly which comprises a cutter wheel, a support plate, a guide housing, a plunger having a hole in its upper portion, said guide housing and plunger being constructed and arranged to provide vertical movement only of said plunger between lowered and raised positions, said cutter wheel being mounted on the bottom part of said plunger for rotation about a horizontal axis, a lifting arm having a roller mounted on its free end and extending into said hole for raising said plunger by pivotal movement of said lifting arm, means mounting said lifting arm for pivotal movement, a block mounted on the top part of said plunger and having a downwardly facing cam surface, a retaining arm having a roller journaled at one end, means for pivotally mounting said retaining arm on the support plate for movement between a first position in which said retaining roller is in a vertical plane other than one through said block and a second position in which said retaining roller is below said block, means urging said retaining arm toward the second position and means to restrain said retaining arm in the first position.

5. The cutter assembly of claim 4 wherein said cutter wheel is rotatably mounted on said plunger by a cutter arm mounted on the bottom part of said plunger for pivotal movement about a horizontal axis and said cutter wheel is rotatably mounted on said cutter arm and wherein said cutter assembly includes a second lifting arm, a housing mounted on the support plate to guide said second lifting arm, means to raise said second lifting arm from a first position spaced below said cutter arm and a second position lifting said cutter arm when said plunger is at said lowered position.

References Cited in the file of this patent
UNITED STATES PATENTS

| | | |
|---|---|---|
| 1,510,656 | Clements | Oct. 7, 1924 |
| 1,887,331 | Shomaker | Nov. 2, 1932 |
| 1,998,929 | Johnstone | Apr. 23, 1935 |
| 2,254,413 | Battershell | Sept. 2, 1941 |